United States Patent
Lee

(10) Patent No.: US 12,181,359 B2
(45) Date of Patent: Dec. 31, 2024

(54) TEST AND CALIBRATION SYSTEM OF ELECTRONIC TORQUE WRENCH

(71) Applicant: Sunheng Technology Co., Ltd., Taichung (TW)

(72) Inventor: Barry Lee, Taichung (TW)

(73) Assignee: SUNHENG TECHNOLOGY CO., LTD., Taichung (TW)

( * ) Notice: Subject to any disclaimer, the term of this patent is extended or adjusted under 35 U.S.C. 154(b) by 298 days.

(21) Appl. No.: 17/850,097

(22) Filed: Jun. 27, 2022

(65) Prior Publication Data

US 2023/0241748 A1 Aug. 3, 2023

(30) Foreign Application Priority Data

Jan. 28, 2022 (TW) ................................. 111104181

(51) Int. Cl.
| | |
|---|---|
| G01L 25/00 | (2006.01) |
| B25B 23/142 | (2006.01) |
| B25B 23/147 | (2006.01) |
| G01M 13/00 | (2019.01) |
| G01M 99/00 | (2011.01) |
| G01L 5/24 | (2006.01) |

(52) U.S. Cl.
CPC ........ *G01L 25/003* (2013.01); *B25B 23/1425* (2013.01); *B25B 23/147* (2013.01); *G01M 13/00* (2013.01); *G01M 99/005* (2013.01); *G01M 99/007* (2013.01); *G01L 5/24* (2013.01); *G01M 99/008* (2013.01)

(58) Field of Classification Search
CPC ........ G01L 25/00; G01L 25/003; G01L 5/24; G01M 13/00; G01M 99/00; G01M 99/005; G01M 99/007; G01M 99/008; B25B 23/147; B25B 23/1425
See application file for complete search history.

(56) References Cited

U.S. PATENT DOCUMENTS

| | | | | |
|---|---|---|---|---|
| 4,314,490 A | * | 2/1982 | Stone | B25B 23/1425 |
| | | | | 81/479 |
| 5,181,425 A | * | 1/1993 | Livingston | G01L 25/003 |
| | | | | 73/862.08 |

(Continued)

FOREIGN PATENT DOCUMENTS

| | | | | |
|---|---|---|---|---|
| CN | 208333753 U | * | 1/2019 | ............. G01L 25/00 |
| TW | 200815741 | | 4/2008 | |

*Primary Examiner* — Benjamin R Schmitt
(74) *Attorney, Agent, or Firm* — Muncy, Geissler, Olds & Lowe, P.C.

(57) ABSTRACT

A test and calibration system of electronic torque wrench includes a base, a sensing device, a force imposing device, and a calibrating device. The sensing device is disposed on the first end of the base and includes a receiving socket to receive the driving portion of the wrench. The force imposing device is disposed on the second end of the base for holding the handle portion of the wrench, such that the wrench imposes the torque on the sensing device which measures the actual torque value. The calibrating device is signally connected with the sensing device and the wrench. When a predetermined torque value is different from the actual torque value, the calibrating device generates a calibrating signal to the electronic torque wrench for the calibration operation. Also, the calibrating device includes a displaying unit for displaying the actual torque value.

8 Claims, 4 Drawing Sheets

(56) References Cited

U.S. PATENT DOCUMENTS

| | | | | |
|---|---|---|---|---|
| 8,117,887 B2* | 2/2012 | Schwafertz | ............ | G01L 25/003 73/1.01 |
| 2009/0222222 A1* | 9/2009 | Lucke | .................. | G01L 25/003 702/41 |
| 2012/0253703 A1* | 10/2012 | Chu | ...................... | G01L 25/003 702/43 |

* cited by examiner

TEST AND CALIBRATION SYSTEM OF ELECTRONIC TORQUE WRENCH

BACKGROUND OF THE INVENTION

1. Field of the Invention

The present invention relates to test and calibration systems, and more particularly, to a test and calibration system of electronic torque wrench.

2. Description of the Related Art

Regarding a torque wrench, after a period of usage, the torque accuracy of the torque wrench starts to decline and needs to be corrected to ensure the stability of accuracy. Referring to Taiwan Patent Publication No. 200815741, a wrench torque testing device is disclosed, which mainly comprises a power assembly, a torque detection assembly, and a control assembly. The power assembly drives the torque detection assembly to rotate, and the torque detection assembly holds one end of the to-be-tested wrench, while the other end of the wrench is stopped by a positioning assembly. The control assembly controls the operation of the power assembly, whereby the strain gauge of the torque detection assembly generates a torque signal, such that the control assembly detects the torque of the wrench, which is taken as the basis for calibrating the torque wrench.

The aforementioned wrench torque testing device simulates the actual force imposing situation of the wrench according to the rotation direction of the torque detection assembly. However, such simulation method is opposite to the practical usage of the wrench by the user, which actually imposes the torque by the torque wrench itself for transmitting the torque to the fastener. Therefore, the test result is unable to present the actual force imposing condition. Furthermore, the base of the aforementioned wrench torque testing device is relatively far from the control host of the control assembly, such testing device lacks a notification mechanism for excessive torque. Thus, the calibrating personnel might accidentally cause an excessive force imposing from the torque wrench due to careless operation, so as to result in device damage.

SUMMARY OF THE INVENTION

To improve the issues above, the present invention discloses a test and calibration system of electronic torque wrench, whose sensing device is configured to receive the driving portion of the electronic torque wrench. The force imposing device drives the electronic torque wrench to impose a torque on the sensing device for measuring an actual torque value. Such test method is identical to the actual operation condition, so as to obtain a more genuine torque data. Also, based on the actual torque value, the calibrating device generates the notification light to be displayed on the displaying unit, so as to notify the user of the test situation for preventing the electronic torque wrench from damaged due to excessive testing.

For achieving the aforementioned objectives, the present invention provides a test and calibration system of electronic torque wrench, the system comprises a base, a sensing device, a force imposing device, and a calibrating device. The base has a first end and a second end in opposite to the first end along an X axis. The sensing device is disposed on the first end. The sensing device has a receiving socket for receiving a driving portion of an electronic torque wrench. The force imposing device is disposed on the second end and comprises a sliding seat and a driving assembly. The slide seat has a pushing portion for receiving a handle portion of the electronic torque wrench. The driving assembly drives the slide seat to move along a Y axis perpendicular to the X axis, so that the electronic torque wrench imposes the torque on the sensing device, whereby the sensing device measures an actual torque value. The calibrating device is signally connected with the sensing device and the electronic torque wrench. The calibrating device comprises a processing unit, a notification unit, a displaying unit, and a calibrating unit. The processing unit compares the actual torque value with a predetermined torque value of the electronic torque wrench. The displaying unit is configured to display the actual torque value. The notification unit, based on the actual torque value, generates a notification light to be displayed on the displaying unit. When there is a difference between the predetermined torque value and the actual torque value, the calibrating unit generates a calibrating signal to the electronic torque wrench for calibrating the predetermined torque value.

With such configuration, the present invention applies a test method which is based on an actual operation condition for driving the handle portion of the electronic torque wrench to move, so as to impose the torque on the sensing device for detecting the actual torque value, thereby obtaining a more genuine torque data.

Also, the notification unit of the calibrating device generates a notification light based on the actual torque value, and the notification light is displayed on the displaying unit for the user to see the light during the testing process, thereby improving the awareness of the user and preventing the electronic torque wrench from damage due to excessive testing.

Furthermore, the calibrating device compares the predetermined torque value with the actual torque value of the electronic torque wrench. When the two values are different, the calibrating unit of the calibrating device generates the calibrating signal to the electronic torque wrench for calibration, which is conveniently carried out without complicated calibrating methods, and the electronic torque wrench does not need to be sent back to the original factory for calibration. Thus, the present invention overcomes the conventional inconvenience of calibration.

DETAILED DESCRIPTION OF THE INVENTION

Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Figure 1:
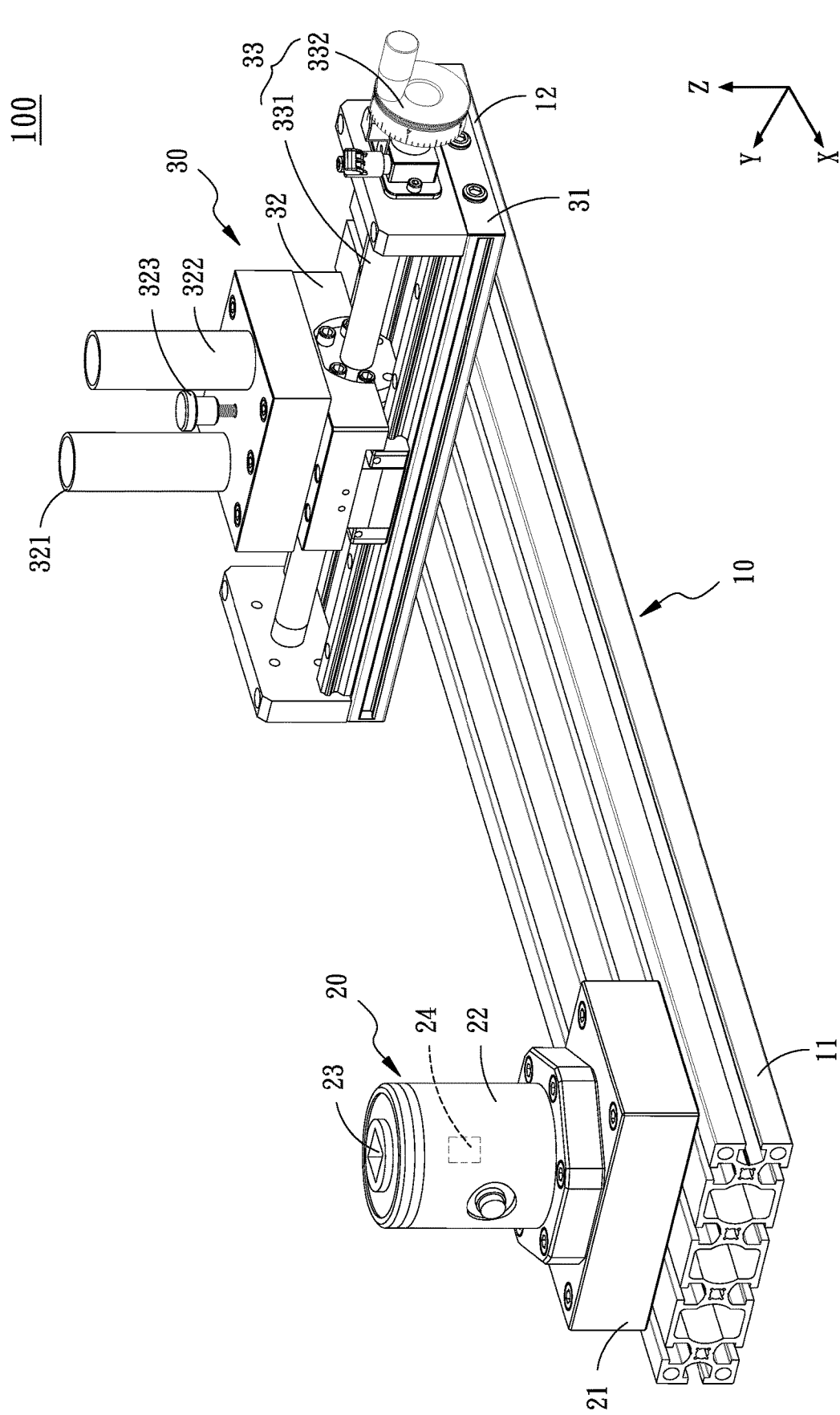
FIG. 1 is a perspective view of the base in accordance with an embodiment of the present invention, illustrating the sensing device and the force imposing device being disposed on two ends of the base.
Figure 2:
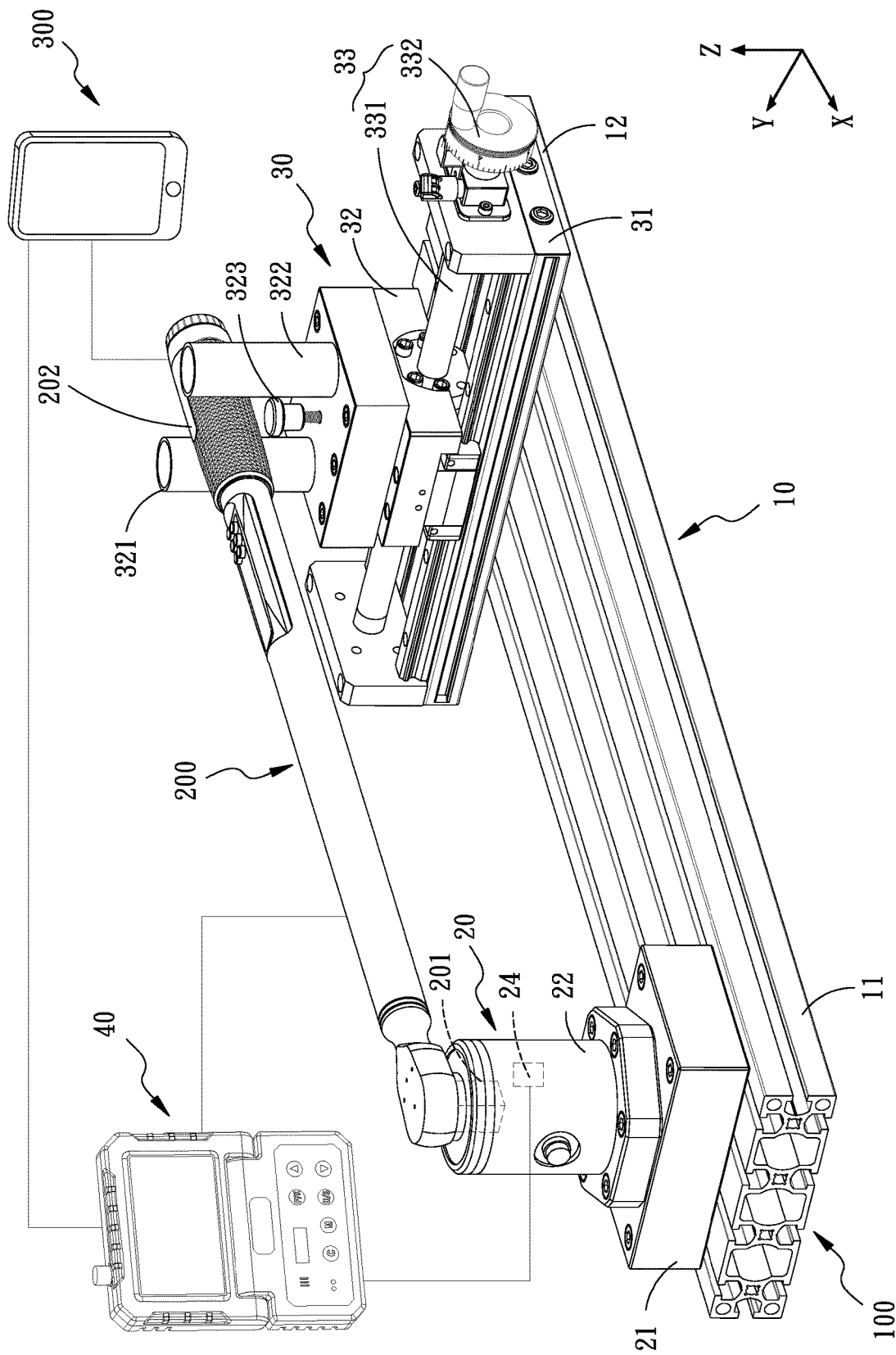
FIG. 2 is a schematic view illustrating the structure of the test and calibration system of electronic torque wrench in accordance with an embodiment of the present invention.
Figure 3:
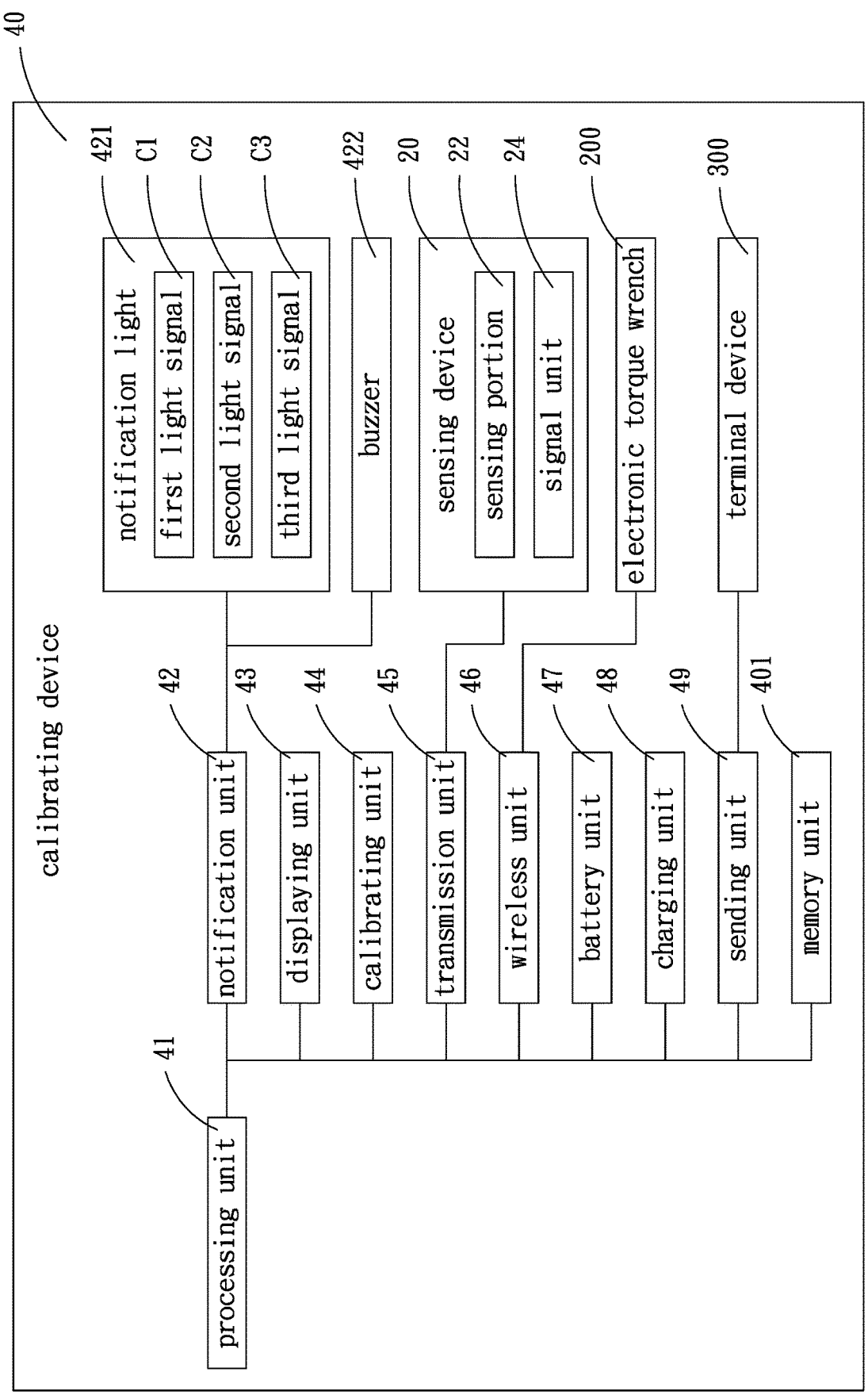
FIG. 3 is a block view of the device of the test and calibration system of electronic torque wrench in accordance with an embodiment of the present invention.
Figure 4:
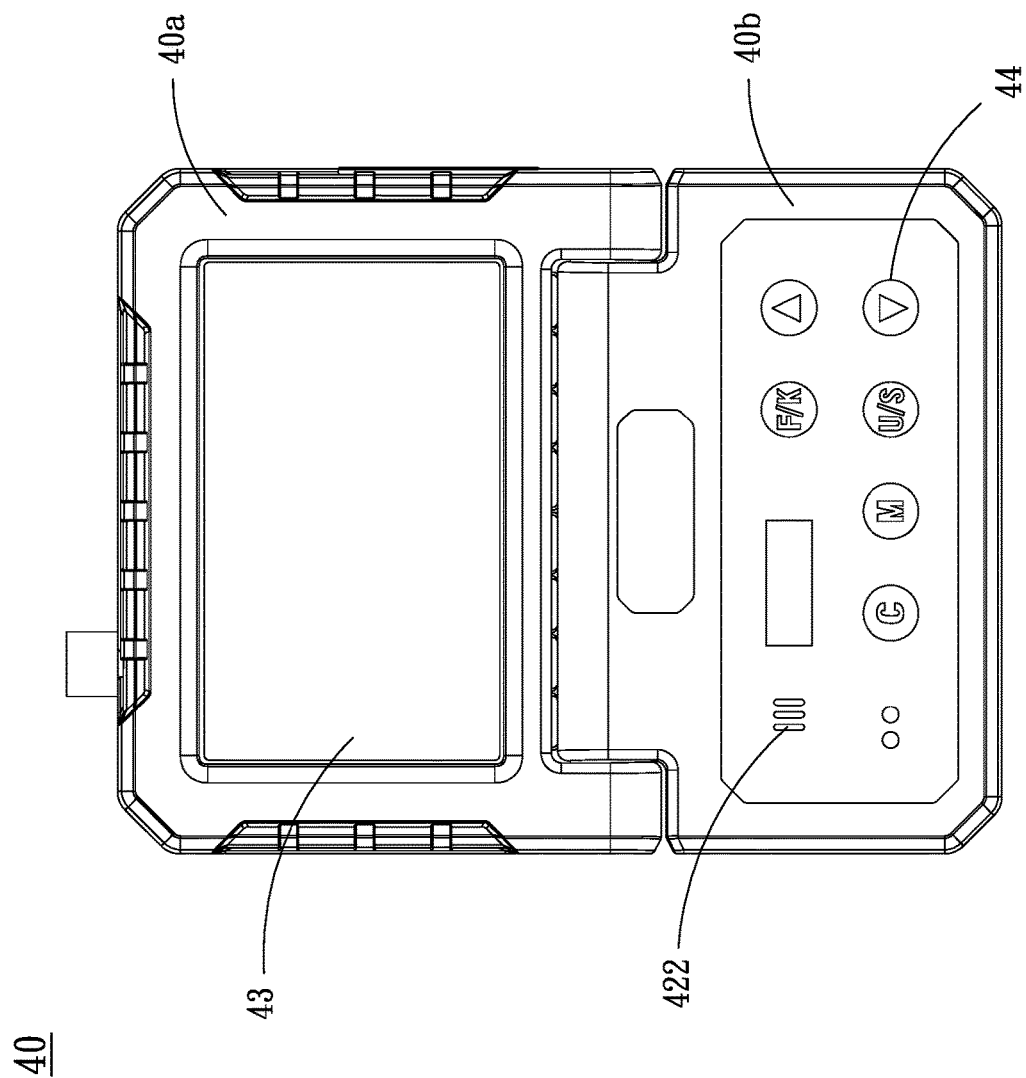
FIG. 4 is a front view of the calibrating device of the test and calibration system of electronic torque wrench in accordance with an embodiment of the present invention.

Referring to FIG. 1 to FIG. 4, an embodiment of the present invention provides a test and calibration system 100 of an electronic torque wrench 200, comprising a base 10, a sensing device 20, a force imposing device 30, and a calibrating device 40. The test and calibration system 100 is applied for calibrating an electronic torque wrench 200, allowing the user to conduct the calibration operation when the actual torque of the electronic torque wrench 200 is not accurate, without the need of sending the wrench back to the original factor for calibration, thus lowering the time demand.

The base 10 comprises a first end 11 and a second end 12 in opposite to the first end 11 along an X axis. The base 10 is approximately formed in a rectangular shape.

The sensing device 20 is disposed on the first end 11 and comprises a fixing portion 21 and a sensing portion 22. The fixing portion 21 is arranged on a certain height and fixed to the first end 11. The sensing portion 22 is configured to sense the torque. The fixing portion 21 comprises a receiving socket 23 disposed along the Z axis for receiving the driving portion 201 of the electronic torque wrench 200. In the embodiment, the sensing portion 22 is disposed corresponding to the size of the driving portion 201 of the electronic torque wrench 200, and the user (testing personnel) is allowed to choose the appropriate sensing portion 22 to be applied with the electronic torque wrench 200. Also, the sensing device 20 further comprises a signal unit 24 for transmitting the value signal detected by the sensing portion 22 to the calibrating device 40.

The force imposing device 30 is disposed on the second end 12. The force imposing device 30 comprises a rail seat 31, a sliding seat 32, and a driving assembly 33. The rail seat 31 is disposed along a Y axis perpendicular to the X axis, and the sliding seat 32 is slidably disposed on the rail seat 31. The driving assembly 33 comprises a transmission rod 331 and an adjusting wheel 332. The transmission rod 331 passes through the sliding seat 32 to be connected thereto. The adjusting wheel 332 is disposed on one end of the transmission rod 331 for driving the transmission rod 331, so as to drive the sliding seat 32 to move along the Y axis. In the embodiment, the sliding seat 32 and the rail seat 31 are combined through a sliding block and sliding rail structure, and the transmission rod 331 is a thread rod which is rotatably combined with the sliding seat 32.

The sliding seat 32 comprises a pushing portion 321 for holding the handle portion 202 of the electronic torque wrench 200. When the user rotates the adjusting wheel 332 to drive the sliding seat 32 to move, the electronic torque wrench 200 imposes a testing torque on the sensing device 20, so that the sensing portion 22 of the sensing device 20 measures an actual torque value. In the embodiment, the force imposing device 30 is applied for the electronic torque wrench 200 to impose the force with respect to the sensing device 20, just as the situation of the user actually operating the electronic torque wrench 200. Therefore, the torque value detected by the sensing device 20 is more genuine and practical, ensuring the accuracy of the test and calibration operation. In the embodiment, the pushing portion 321 comprises two pillar 322 disposed at intervals, between which the handle portion 202 of the electronic torque wrench 200 is disposed. Also, a supporting member 323 is disposed between the two pillars 322. The supporting member 323 is screwed to the sliding seat 32. The supporting member 323 is adjustable in height for supporting the handle portion 202.

The calibrating device 40 is signally connected with the sensing device 20 and the electronic torque wrench 200. The calibrating device 40 comprises a first main body 40a and a second main body 40b. The first main body 40a and the second main body 40b are pivotally overlapped for facilitating the storage and portability. The calibrating device 40 further comprises a processing unit 41, and a notification unit, a displaying unit 43, a calibrating unit 44, a transmission unit 45, a wireless unit 46, a battery unit 47, and a charging unit 48 that are coupled with the processing unit 41. The battery unit 47 provides the power needed for the operation of the calibrating device 40. The charging unit 48 is a USB connection port for being electrically connected with an external power source, so as to charge the battery unit 47. The transmission unit 45 is connected with the signal unit 24 of the sensing device 20 through a wireless or wired connection. In the embodiment, the transmission unit 45 is wirelessly connected with the signal unit 24 for receiving the actual torque value. The wireless unit 46 is wirelessly paired and signally connected with the electronic torque wrench 200 through, for example, Bluetooth connection. The processing unit 41 compares the actual torque value and a predetermined torque value of the electronic torque wrench 200.

When the predetermine torque is different from the actual torque value, the calibrating unit 44 generates a calibrating signal which is sent through the wireless unit 46 to the electronic torque wrench 200 for calibrating the predetermined torque value.

The displaying unit 43 is disposed on the first main body 40a of the calibrating device 40 for displaying the actual torque value, such that the user is able to be aware of the variation of torque value at all times during the testing process. The notification unit 42 generates a notification light 421 based on the actual torque value, and the notification light 421 is displayed on the displaying unit 43. In the embodiment, the notification light 421 includes a first light signal C1, a second light signal C2, and a third light signal C3. The first light signal C1 is in a green color. The second light signal C2 is in an orange color. The third light signal C3 is in a red color. The first light signal C1 corresponds to a safe range of torque value. The second light signal C2 corresponds to a transition range of torque value; the transition range of torque value is larger than the safe range of torque value. The third light signal C3 corresponds to a warning range of torque value; the warning range of torque value is larger than the transition range of torque value. Therein, in the present invention, the safe range of torque value ranges from 0% to 80% of the maximum torque value of the electronic torque wrench 200; the transition range of torque value ranges from 81% to 90% of the maximum torque value of the electronic torque wrench 200; the warning range of torque value ranges from 91% to 100% of the maximum torque value of the electronic torque wrench 200. For example, when the maximum torque value of the electronic torque wrench 200 is 200 Newton-meters (Nm), during the test and calibration process, the predetermined torque value is set as 110 Newton-meters. Through the aforementioned operation of the force imposing device 30, the sensing device 20 measures that the actual torque value is 100 Newton-meters, which is within the safe range of torque value, so that the notification light 421 is presented as the first light signal C1 which is in a green color. Similarly, when the sensing device 20 measures the actual torque value being 180 Newton-meters, the value falls within the warning range of torque value, such that the notification light 421 is presented as the third light signal C3 which is in a red color. Thus, the present invention applies the light signal to remind the user to prevent the excessive rotation of the adjusting wheel 332 for preventing the electronic torque wrench from imposing excessive force, thereby avoiding damage of the wrench.

Also, the notification unit 42 further comprises a buzzer 422. When the notification light 421 presents the second light signal C2 or the third light signal C3, the buzzer 422 is triggered to operate. Therefore, the present invention notifies the user by sound and light signal at the same time, so as to improve the notification effect.

The calibrating unit 44 is disposed on the second main body 40*b* of the calibrating device 40. In the embodiment, the calibrating unit 44 is a button type interface. The calibrating device 40 further comprises a sending unit 49 coupled with the processing unit 41 for wirelessly connecting a terminal device 300, which is, for example, a smartphone. Therefore, the actual torque value is displayed on the terminal device 300, and the terminal device 300 can be used to record the torque values. In another embodiment, the calibrating unit 44 further comprises a memory unit 401 coupled with the processing unit 41. The memory unit 401 is able to record the actual torque value for subsequent usage by the user. In another embodiment, the calibrating unit 44 comprises a plurality of function buttons on the second main body 40*b* for carrying out different functional operations.

In another embodiment, the calibrating device 40 and the sensing device 20 can be integrally formed. In other words, the calibrating device 40 and the sensing device 20 belong to a same component.

With the foregoing configuration, the actual torque value detected by the sensing device 20 of the present invention is obtained by simulating the actual operation conditions of the wrench, so as to obtain the genuine testing value. Also, the calibration operation is allowed to be completed by a one-time of calibrating process, such that the wrench is efficiently restored to the original factory setting. Therefore, the present invention achieves an efficient and convenient operation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A test and calibration system of an electronic torque wrench, the system comprising:
   a base having a first end and a second end in opposite to the first end along an X axis;
   a sensing device disposed on the first end, the sensing device having a receiving socket for receiving a driving portion of the electronic torque wrench;
   a force imposing device disposed on the second end, the force imposing device having a sliding seat and a driving assembly, the sliding seat having a pushing portion for receiving a handle portion of the electronic torque wrench, the driving assembly being configured to drive the sliding seat to move along a Y axis perpendicular to the X axis, such that the electronic torque wrench imposes a torque on the sensing device, and the sensing device measures an actual torque value;
   a calibrating device signally connected with the sensing device and the electronic torque wrench, the calibrating device comprising a processing unit, a notification unit, a displaying unit, and a calibrating unit, the processing unit being configured to compare the actual torque value with a predetermined torque value of the electronic torque wrench, the displaying unit being configured to display the actual torque value, the notification unit generating a notification light based on the actual torque value, and the light signal being displayed on the displaying unit, the notification light includes a first light signal, a second light signal, and a third light signal; the first light signal corresponds to a safe range of torque value; the second light signal corresponds to a transition range of torque value, and the transition range of torque value is larger than the safe range of torque value; the third light signal corresponds to a warning range of torque value, and the warning range of torque value is larger than the transition range of torque value; the safe range of torque value ranges from 0% to 80% of a maximum torque value of the electronic torque wrench; the transition range of torque value ranges from 81% to 90% of the maximum torque value of the electronic torque wrench; the warning range of torque value ranges from 91% to 100% of the maximum torque value of the electronic torque wrench; wherein when the predetermined torque value is different from the actual torque value, the calibrating unit generates a calibrating signal to the electronic torque wrench for calibrating the predetermined torque value.

2. The test and calibration system of the electronic torque wrench of claim 1, wherein the notification unit further comprises a buzzer; when the notification light presents the second light signal or the third light signal, the buzzer is triggered to operate; the first light signal is in a green color; the second light signal is in an orange color; the third light signal is in a red color.

3. The test and calibration system of the electronic torque wrench of claim 2, wherein the calibrating device further comprises a transmission unit, a wireless unit, a battery unit, and a charging unit that are coupled with the processing unit; the transmission unit is connected with the sensing device through a wireless or wired connection; the wireless unit is wirelessly paired and signally connected with the electronic torque wrench.

4. The test and calibration system of the electronic torque wrench of claim 3, wherein the calibrating device further comprises a sending unit coupled with the processing unit for wirelessly connecting a terminal device, such that the actual torque value is displayed on the terminal device.

5. The test and calibration system of the electronic torque wrench of claim 4, wherein the calibrating device further comprises a first main body and a second main body; the first main body and the second main body are pivotally overlapped; the displaying unit is disposed on the first main body, and the calibrating unit is disposed on the second main body.

6. The test and calibration system of the electronic torque wrench of claim 4, wherein the calibrating device and the sensing device are structurally integrated.

7. The test and calibration system of the electronic torque wrench of claim 1, wherein the force imposing device comprises a rail seat being disposed along a Y axis; the sliding seat is slidably disposed on the rail seat; the driving assembly comprises a transmission rod and an adjusting wheel; the transmission rod passes through the sliding seat to be connected thereto; the adjusting wheel is disposed on one end of the transmission rod for driving the transmission rod, so as to drive the sliding seat to move.

8. The test and calibration system of the electronic torque wrench of claim 7, wherein the pushing portion comprises two pillars disposed at intervals for holding the handle portion; a supporting member is disposed between the two pillars; the supporting member is adjustable in height for supporting the handle portion.

\* \* \* \* \*